United States Patent [19]
Meschke et al.

[11] 3,712,164
[45] Jan. 23, 1973

[54] SAW FOR TRIMMING CAST GRIDS
[75] Inventors: Harry H. Meschke, Portage; Ronald C. Van Linder, Watervliet, both of Mich.
[73] Assignee: Winkel Machine Company, Inc., Kalamazoo, Mich.
[22] Filed: March 22, 1971
[21] Appl. No.: 126,861

[52] U.S. Cl. .....................83/390, 83/391, 83/417, 83/484, 83/903
[51] Int. Cl. .............................................B26d 5/42
[58] Field of Search........83/390, 391, 417, 484, 488, 83/578, 903

[56] References Cited

UNITED STATES PATENTS 3,051,030   8/1962   Winkel.................................83/903 X

*Primary Examiner*—Gil Weidenfeld
*Attorney*—Woodhams, Blanchard & Flynn

[57] ABSTRACT

Apparatus for trimming battery grids supplied to a downwardly inclined track. First stop means is spaced downwardly from the upper end of the track and includes first support means for supporting the first stop means for movement between a blocking and unblocking position so that the battery grid is blocked thereby when the first stop means is in the blocking position and releases the grid when the first stop means is in the unblocking position. Second stop means is spaced an adjustable distance downwardly along the track from the first stop means. The second stop means includes support means for supporting the second stop means for movement between blocking and unblocking positions so that a grid is blocked and held between the first and second stop means when same is in the blocking position and releases the grid when same is in the unblocking position. Carriage means and drive means therefor are mounted on a guide for movement therealong. Rotating saw means are supported on the carriage and adapted to engage and thereby trim the grid as the carriage is driven along the guide. Clamping means are positioned between the first and second stop means and movable between open and closed positions and is adapted to clamp the grid in a fixed position during the trimming procedure. Control means are provided for causing a movement of the carriage means along the guide only when the clamp means is in the closed position.

5 Claims, 4 Drawing Figures

SAW FOR TRIMMING CAST GRIDS

FIELD OF THE INVENTION

This invention relates in general to an apparatus for trimming battery grids and, more particularly, to an improved apparatus for trimming grids in a more effective manner than previous apparatus for the same or similar purposes.

BACKGROUND OF THE INVENTION

Various types of machines are known for casting and trimming a grid wherein the grids are cast in a vertical position between two relatively reparable mold parts and dropped from between these mold parts onto a guide which will deliver the grid castings one at a time to a grid trimming apparatus. U.S. Pat. Nos. 2,638,982, 2,858,931 and 3,051,030 are examples of a few known grid casting and trimming machines.

In accordance with the present practice, a pouring gate or gates and the inevitable flashing adhering to the battery grids as cast have been removed by reciprocating blades which are generally similar to paper or sheet metal cutters in operation. In accordance with the teaching in U.S. Pat. No. 2,621,219 and the aforementioned 2,638,982, locating lugs or other stop engaging portions may be cast on the leading edge of a single or double grid and so arranged as to engage a fixed stop means. Whichever means is employed for locating the battery grids with respect to the trimming knives, it is recognized that such trimming means has material disadvantages. One of these is that such trimming apparatus tends to crush the upper surface of the grid adjacent the cut and to tear the lower surface, leaving a jagged edge on the battery grid. This problem has not been serious where the battery grids are thin, such as are used in automobile batteries. However, where the battery grids are thick, such as those grids that are used in industrial vehicles, golf carts and lift trucks, the knife blades do not trim the battery grid satisfactorily at all and, in fact, may even render the grids unusable.

However, in pursuance of a constant effort to improve the art, it has been observed that all previous machines of this general character, insofar as I am aware, have utilized either trimming knives which extend transversely of the downwardly extending track and are unsatisfactory as above stated, or they have utilized a pair of stationary circular saw blades and a clamp by which the grids are tightly gripped for transporting by conveyor mechanism past the saw blades. However, this latter system could not always assure that the grids would be properly oriented on the conveyor mechanism and hence often results in some grids being trimmed incorrectly. Hence, it is desired to provide an improved trimming apparatus which may be added to existing equipment.

Therefore, the objects of this invention include:

1. to provide a grid trimming apparatus wherein the grids are clamped in a stationary condition in the trimming apparatus and a power saw or saws (preferably circular saws) are moved laterally across the grids to thereby trim the flashing therefrom and simultaneously therewith provide a more accurate and cleaner line of severance than the known reciprocating knives;

2. to provide an improved battery grid trimming apparatus incorporating novel means for advancing the saw carriage laterally across the grids during the trimming operation;

3. to provide a battery grid trimming apparatus which is reliable, efficient and economical to manufacture;

4. to provide a structure, as aforesaid, which is particularly adaptable to handling either light or thin grids or heavy or thick grids cleanly and accurately and without bending or breaking them.

Other objects and purposes of this invention will become apparent to persons familiar with this type of equipment upon reading the following specification and examining the accompanying drawings, in which.

Figure 1:
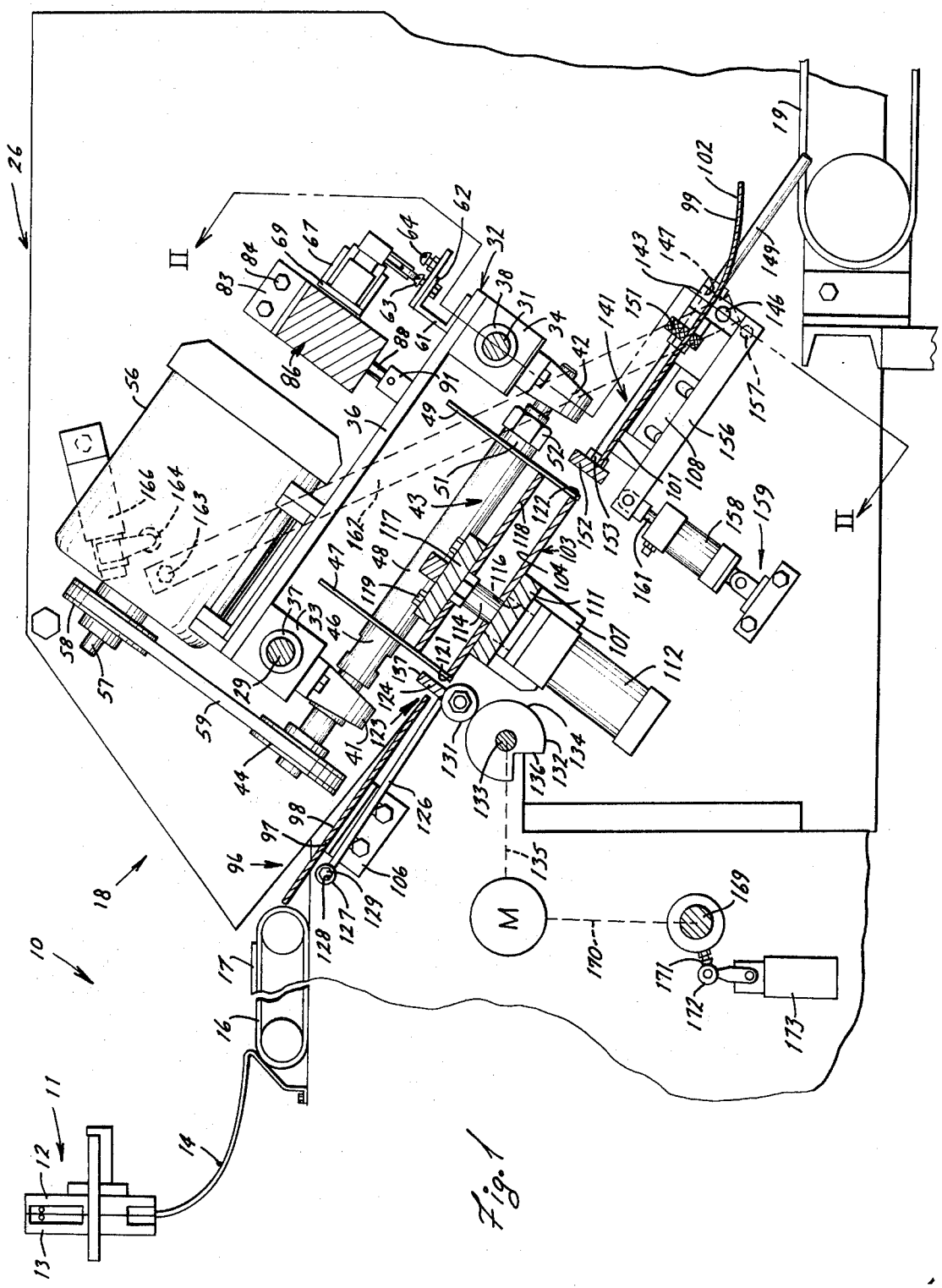
FIG. 1 is a side elevational view, partially sectioned, of a combination casting and trimming machine for battery grids.

Certain terminology will be used in the following description for convenience in reference only and will not be limiting. The words "up," "down," "right" and "left" will designate directions in the drawings to which reference is made. The words "front" and "rear" will refer to the direction that the grids move through the device, "front" being downwardly and to the right as illustrated in FIG. 1. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing an apparatus for trimming a battery grid, which apparatus has an inclined downwardly extending track. The apparatus includes first stop means spaced downwardly from the upper end of the track and includes first support means for supporting the first stop means for movement between blocking and unblocking positions so that the first stop means will block a grid when in the blocking position and release the grid when in the unblocking position. Second stop means are spaced downwardly along the track from the first stop means and includes adjustable support means therefor for supporting the second stop means for adjustable movement toward and away from the first stop means. Second support means are provided for supporting the second stop means for movement between blocking and unblocking positions so that the second stop means blocks a grid and holds same between the first and second stop means when in the blocking position and releases the grid when in the unblocking position. Guide means are provided and extend generally parallel to at least one of the first and second stop means in vertically spaced relation to the track. Carriage means and drive means therefor are mounted on the guide means and are supported for movement therealong. Rotating saw means are supported on the carriage and are adapted to engage and thereby trim the grid as the carriage is driven along the guide means. Clamping means are positioned between the first and second stop means and are movable between open and closed positions and are adapted to clamp the grid when in the closed position. Control means are provided for causing a movement of the carriage means along the guide means only when the clamp means is in the closed position.

DETAILED DESCRIPTION

Referring now to the drawings in detail, the battery grid molding and trimming apparatus 10 (FIG. 1) comprises a grid molding apparatus 11 which includes a pair of relatively reciprocable mold halves 12 and 13 separable in this embodiment along a substantially vertical plane. An arcuate slide 14 is provided below the molding apparatus 11 so that the grids will fall thereon when the molds are opened. The slide 14 is curved to direct the grids from a vertical position to a substantially horizontal position. A horizontal endless conveyor 16 is provided for delivering a grid 17 from the curved slide 14 to the grid trimming apparatus 18 and thence to a substantially horizontal endless conveyor 19.

All of the foregoing described apparatus, with the exception of the grid trimming apparatus 18, is fully described in U.S. Pat. No. 2,638,982 and reference is to be made thereto for further details thereof. The invention in this application, however, relates to a new and improved grid trimming apparatus 18 which will be described in more detail hereinbelow.

Figure 3:
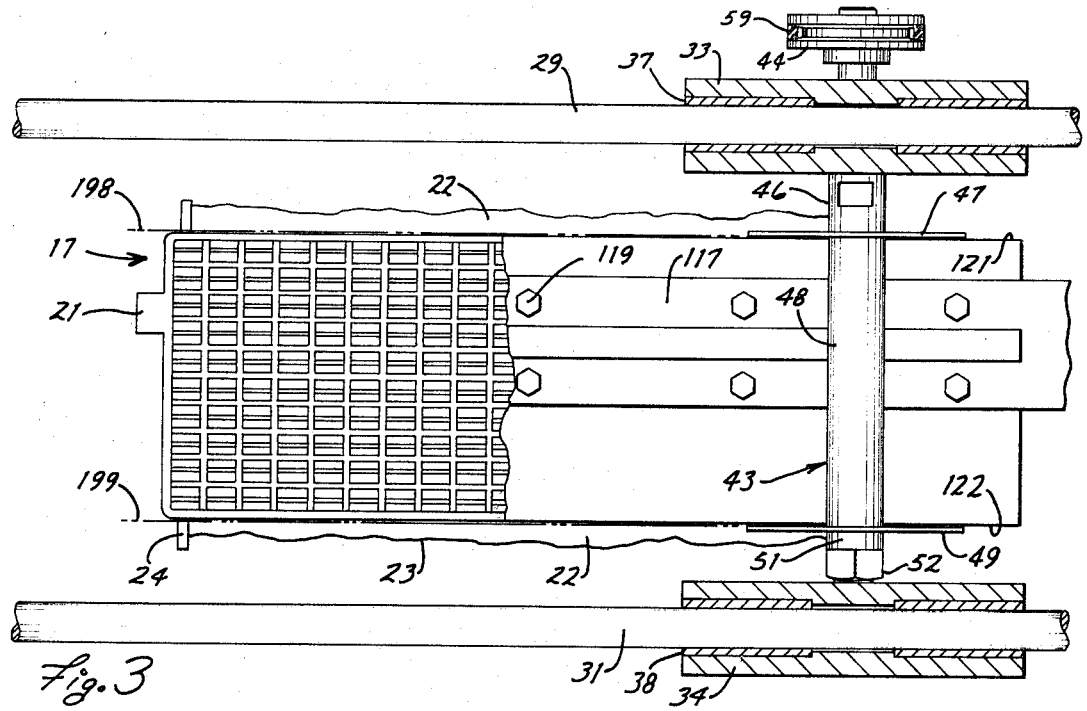
FIG. 3 is a sectional view taken along the line III—III of FIG. 1.

An untrimmed grid 17 is shown in FIG. 3 and comprises the usual lugs 21 which, when assembled in a battery, form the terminal post for the battery. In casting these battery grids, a flash or fin 22 forms on the upper and lower edges of the grid, due to the impossibility of securing sufficiently accurately the adjacent mold sections at the top and bottom sides thereof. In order to provide a grid casting which will be properly aligned in the grid trimming apparatus 18, the advance or front edge 23 of the grid casting has a pair of positioning lugs 24 which are cast sufficiently long so as to extend in advance of the most advanced portion of the overflow fin or flash.

Figure 2:
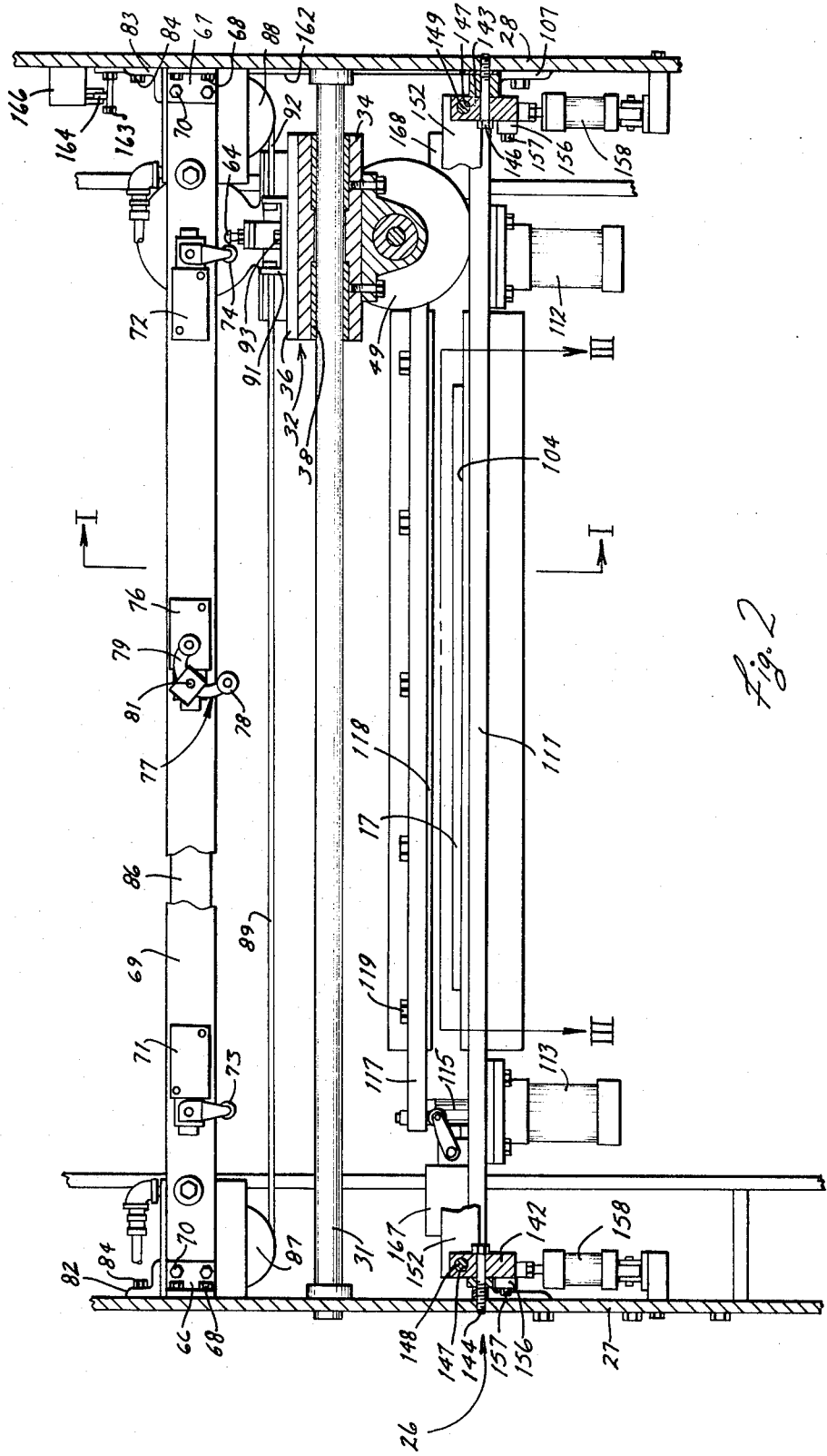
FIG. 2 is a sectional view taken along the line II—II of FIG. 1.

Referring now to the grid trimming section 18 in detail, the grid trimming section 18 comprises a frame 26 having a pair of parallel upstanding sidewalls 27 and 28 (FIG. 2). A pair of parallel guide rails 29 and 31 (FIG. 1) are secured to and extend between the sidewalls 27 and 28. A carriage 32 is mounted on the rails 29 and 31 and is adapted for movement longitudinally thereof. The carriage 32 comprises a pair of rail engaging members 33 and 34 interconnected by a mounting plate 36. Bushing members 37 and 38 are mounted internally of the rail engaging members 33 and 34, respectively, to facilitate the sliding movement of the carriage 32 along the guide rails 29 and 31.

Bearing blocks 41 and 42 are secured to the bottom surface of the rail engaging members 33 and 34, respectively. A shaft 43 is rotatably supported by bearings in the bearing blocks 41 and 42. A pulley 44 is fixedly secured to the shaft 43 rearwardly of the bearing block 41. A fixed spacer member 46 is spaced inwardly of the bearing block 41 and is secured to the shaft 43 and rotatable therewith. A circular saw blade is mounted on the shaft 43 and abuts against the fixed spacer member 46. A removable spacer member 48 is mounted on the shaft 43 and is adapted to abut against the forward face of the circular saw blade 47 as illustrated in FIG. 1. A second saw blade, here also a circular saw blade 49, is mounted on the shaft 43 and is adapted to abut against the forward end of the adjustable spacer member 48. A second adjustable spacer member 51 is mounted on the shaft 43 and is adapted to abut against the forward face of the circular saw blade 49. A nut 52 is adapted to be threaded onto the threads 53 at the forward end of the shaft 43 to secure the adjustable spacer members 48 and 51, as well as the circular saw blades 47 and 49, on the shaft 43 and to maintain a fixed distance between the circular saw blades 47 and 49.

A motor 56, here an electric motor, is fixedly mounted on the upper surface of mounting plate 36 by any conventional means such as screws not illustrated. The output shaft 57 of the motor 56 has a pulley 58 fixedly secured thereto and rotatable therewith. The pulley 58 is aligned with the pulley 44 on the shaft 43 and an endless belt 59 is secured to the pulleys 44 and 58 so that the motor 56, when energized, will drive the shaft 43 and thence the circular saw blades 47 and 49 for rotation.

A bracket 61 is secured to the upper surface of the mounting plate 36. The bracket 61 has a leg 62 which is spaced above and extends generally parallel to the mounting plate 36 and has a pair of switch engaging elements 63 and 64 mounted thereon.

A pair of brackets 66 and 67 (FIG. 2) are secured to the sidewalls 27 and 28, respectively, of the frame 26 by a plurality of screws 68. A bar 69 is secured to each of the brackets 66 and 67 by screws 70 and extends generally horizontally therebetween.

A pair of control switches 71 and 72 are secured to the bar 69 adjacent the left and right ends of travel (FIG. 2) of the carriage 32. The actuating arms 73 and 74 of the control switches 71 and 72, respectively, are positioned to be engaged by the switch engaging element 63 on the bracket 61. A control switch 76 is mounted generally between the control switches 71 and 72 on the bar 69, generally at the mid-point of travel of the carriage 32. The actuating arm 77 on the control switch 76 comprises lever arms 78 and 79 having a C-shape and pivotable about a pivot axis 81. The free end of each of the arms 78 and 79 are engageable with the switch engaging element 64 on the bracket 61.

A pair of brackets 82 and 83 (FIG. 2) are fixedly secured to the sidewalls 27 and 28 by any convenient means such as the screws 84. A power cylinder 86 (FIGS. 1 and 4) is secured to the brackets 82 and 83 by any convenient means and extends therebetween in a generally horizontal relationship. The power cylinder 86 may be of any conventional type such as a Model 100-150 made by Tol-O-Matic, Inc., 246 Tenth Ave. South, Minneapolis, Minn.

The power cylinder 86 includes a pair of pulleys 87 and 88 (FIGS. 2 and 4) mounted at opposite ends of the cylinder 86 as illustrated in FIG. 2. One end of a cable 89 is secured to one side of the piston 85 (FIG. 4) in the power cylinder 86 and extends around the pulley 87 and is secured at the opposite end to a bracket 91. A cable 92 is secured to the opposite side of the piston 85 of the power cylinder 86 and extends around the pulley 88 and is secured to the opposite side of the bracket 91.

The bracket 91 is in turn fixedly secured to the mounting plate 36 of the carriage 32 by any convenient means such as a screw 93. Thus, energization of the power cylinder 86 will effect a movement of the piston 85 longitudinally thereof and effect a movement of the carriage 32 along the guide rails 29 and 31.

A track 96 is provided in the grid trimming section 18 and extends below the carriage 32. The track 96 comprises an upper track section 97 which is secured to the sidewalls 27 and 28 by brackets 106 and inclined downwardly from the end of the endless conveyor belt 16 toward the upper circular saw blade 47. The upper surface 98 of the track section extends parallel with the axis of rotation of the shaft 43 and is positioned above the lowermost point of the circular saw blade 47. The track 96 also comprises a lower track section 99 positioned below the lower circular saw blade 49 and is secured to the sidewalls 27 and 28 by brackets 108. The upper surface 101 of the track section 99 adjacent the saw blade 49 is parallel to the axis of rotation of the shaft 43 and coplanar with or slightly below the plane of the upper track section 98. The upper surface portion 102 of the lower track section 99 is curved so that the lowermost end is almost parallel with the upper reach of the endless conveyor 19.

The track 96 also comprises a track section 103 secured to the sidewalls 27 and 28 by brackets 107. The track section 103 is disposed between the circular saw blades 47 and 49. The track section 103 comprises a clamping mounting plate 111 secured to the brackets 107 and extends between the sidewalls 27 and 28. A clamp plate 104 is mounted on the mounting plate 111 and is secured thereto by any convenient means such as screws not illustrated. The upper surface of the clamp plate 104 is parallel to the axis of rotation of the shaft 43 and is preferably disposed in a position which is parallel to the upper surfaces 98 and 101 of the track section 97 and 99, respectively, but disposed between the two planes defined thereby so that a small step is provided when a grid 17 slides from the track section 97 onto the track section 103 and from the track section 103 to the upper end of the track section 99.

A pair of power cylinders 112 and 113 are secured to the mounting plate 111 and extend downwardly therefrom as shown in FIGS. 1 and 2. The rods 114 and 115 of the power cylinders 112 and 113, respectively, extend upwardly through an opening 116 in the mounting plate 111. The pair of cylinders 112 and 113 are disposed on either side of the track section 103 so that the rods of the cylinders are not in the path of the grids as they pass thereby.

A clamp mounting plate 117 is secured to the upper end of the rods 114 and 115 of the cylinders 112 and 113. A clamping plate 118 is secured to the underside of the mounting plate 117 by a plurality of screws 119. The clamping plate 118 is disposed parallel to the upper surface of the clamping plate 104. The upper edge 121 of the clamp plate 104 is disposed closely adjacent the lower cutting edge of the circular saw blade 47 and the lower edge 122 of the clamp plate is disposed adjacent the lower cutting edge of the circular saw blade 49.

Thus, energization of the power cylinders 112 and 113 will effect a vertical reciprocatory movement of the clamp plate 118 toward and away from the clamp plate 104 to clamp a grid 17 therebetween for the purpose of trimming same.

A gate mechanism 123 is provided adjacent the lower edge of the upper track section 97 rearwardly of the circular saw blade 47. The gate mechanism 123 comprises a bar 124 which extends laterally across the bottom edge of the track 97 for the purpose of stopping grids 17 as they move from the endless conveyor 16 toward the saw blade 47. A pair of arms (here only one arm 126 is illustrated in FIG. 1) are connected to the opposite ends of the bar 124. The rear end of the bars, here bar 126, have an enlarged end 127 which has an opening 128 therethrough for receiving a shaft 129 secured to the sidewalls of the frame to pivotally support the bar 124. A pair of rollers (only roller 131 is illustrated in FIG. 1) are secured to the opposite ends of the bar 124. A cam 132 is rotatably supported on a shaft 133 and driven for rotary movement therewith by a motor M through conventional gearing 135 illustrated in broken lines. The cam 132 has a cam surface 134 on which the rollers 131 ride to maintain the bar 124 in blocking position. The cam 132 also has a recess 136 therein into which the rollers 131 are received to cause the bar 124 to pivot downwardly about the axes of the shafts 128 so that the upper edge 137 of the bar 124 is below the plane of the surface 98 of the track section 97. The position of the recess 136 is such that the bar 124 will only be lowered when the carriage 32 is disposed at one of the lateral sides of the guide rails 29 and 131, such as the position illustrated in FIG. 2.

A lower gate mechanism 141 is provided adjacent the upper or rearward edge of the track section 99 but spaced downwardly from the circular saw blade 49. The gate mechanism 141 comprises a pair of brackets 142 and 143 pivotally secured to the sidewalls 27 and 28 of the frame 26 through pivot pins 144 and 146, respectively. The brackets 142 and 143 each have an opening therein, such as the threaded opening 147. Elongated threaded rods 148 and 149 are received respectively in each of the threaded openings and extend rearwardly of the brackets 142 and 143. Nuts 151 are threaded onto each of the rods 148 and 149 and are adapted to lock the threaded rods 148 and 149 in the desired position relative to the brackets 142 and 143. A bar 152 is secured to the rearward end of each of the rods 148 and 149 and includes a connective member 153 which permits a relative rotation of the threaded rods 148 and 149 so that the position of the bar 152 may be adjusted relative to the saw blade 49. The bar 152 is pivotal about the pivot pins 144 and 146 between a blocking position illustrated in FIG. 2 and an unblocking raised position above the track section 103 and 99.

An arm 156 is secured to the lower end of each of the brackets 142 and 143 by a screw 157 and extend rearwardly therefrom as illustrated in FIG. 2. A power cylinder 158 is mounted to each of the sidewalls 27 and 28 of the frame 26 by a bracket 159. The rods 161 of the power cylinders 158 are connected to the rearward end of the arms 156 for purposes of moving the arms about the axes of the pivot pins 144 and 146. Thus, appropriate energization of the power cylinders 158 will effect a pivoting movement of the bar 152 from the blocking position illustrated in FIG. 2 to a raised unblocking position to permit a grid 17 to slide from the track section 103 onto the track section 99.

An arm 162 (FIG. 1) is secured to the bracket 143 and extends along the sidewall 28 to a position above the carriage 32. A finger 163 is secured to the upper end of the arm 162 and is adapted to engage the actuating arm 164 of a control switch 166 mounted to the sidewall 28 as illustrated in FIG. 2.

A pair of control switches 167 and 168 are secured to the clamp mounting plate 111 (FIG. 2) and the actuating arms thereof are adapted to be engaged by the clamp mounting plate 117 when the clamp mounting plate 117 is moved to the closed position.

The guide mechanism for the grid trimming section 18 also includes a drive shaft 169 driven by a motor M through conventional gearing illustrated in broken lines 170. The drive shaft 169 supports a cam member 171 which is rotatable therewith. The cam member 171 is adapted to engage the actuating arm 172 of a control switch 173 to control the starting of a trimming operation in the grid trimming section 18.

Figure 4:
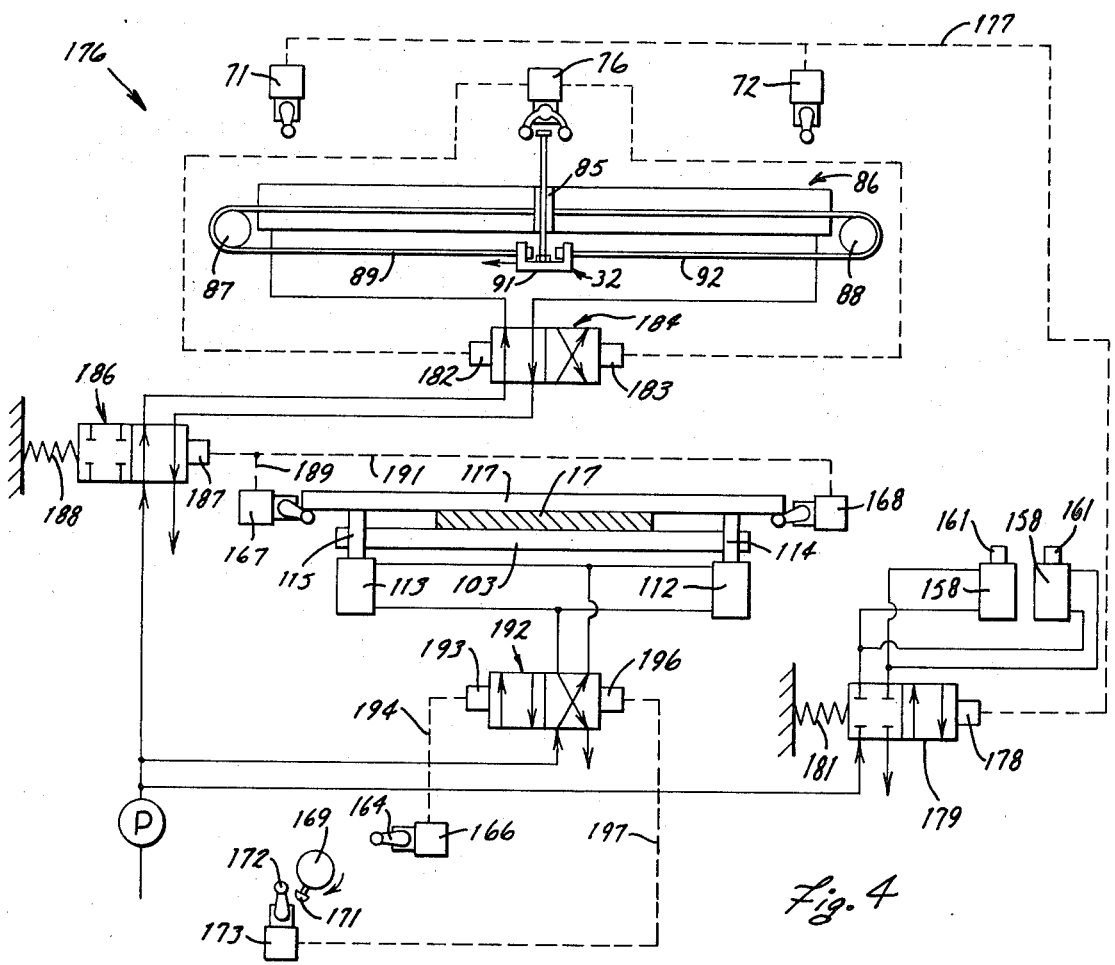
FIG. 4 is an example of one type of electromechanical circuit for the grid trimming apparatus.

FIG. 4 illustrates schematically an electropneumatic circuit 176 for causing the grid trimming section 18 to function in a desired sequence. The electropneumatic circuit 176 is only an example of one type of control circuit required to carry out the grid trimming operation.

Pressurized fluid is supplied to the electropneumatic circuit 176 by a pump P. The pneumatic fluid lines have been illustrated as solid lines and the electrical lines have been illustrated as broken lines.

The output of the control switches 71 and 72 are connected through a line 177 to a solenoid 178 on a valve 179 which controls the operation of the power cylinders 158. The valve 179 is normally maintained in the position illustrated by a spring 181. Appropriate energization of the solenoid 178 will cause the valve 179 to shift leftwardly against the urging of the spring 181 to cause the power cylinders 158 to be energized in a manner to cause the rods 161 thereof to be pushed upwardly.

The control switch 76 controls solenoids 182 and 183 on opposite ends of a valve 184. The valve 184 controls the direction of movement of the piston 85 in the power cylinder 86 and thereby controls the direction of movement of the carriage 32 along the guide rails 29 and 31. A valve 186 serves to control the flow of pressurized fluid to the valve 84 and has a solenoid 187 disposed thereon to shift the valve, when energized, against the urging of a spring 188. The solenoid 187 is responsive to energization caused by the control switches 167 and 168, which are activated upon a closing of the clamp mounting plate 117. The control switches 168 and 169 are connected through lines 189 and 191, respectively, to the solenoid 187 on the valve 186.

The clamp mounting plate 117 is controlled by the power cylinders 112 and 113 which are controlled by a valve 192. A solenoid 193 is provided on one end of the valve 192 and is responsive to an actuation of the control switch 166 through the line 194. A solenoid 196 is provided on the opposite end of the valve 192 and is responsive to an actuation of the control switch 173 through the line 197.

OPERATION

Although the operation of the mechanism described above will be understood from the foregoing description by skilled persons, a summary of such description is now given for convenience.

The saw blades 47 and 49 are driven for rotation by the motor 56. As a result, a movement of the carriage 32 laterally across the trimming section causes the blades 47 and 49 to engage the flash 22 and trim same along the lines 198 and 199.

When a grid 17 has been ejected from the molding apparatus 11 and has been delivered to the trimming section 18 by the endless conveyor 17, the grid is then delivered to the upper track section 97 and is caused to slide under the influence of gravity down the track so that the positioning lugs 24 engage the bar 124 of the gate mechanism 123. At the start of a grid trimming operation, the carriage 32 is located to one side of the machine, for example, in the position illustrated in FIG. 2. A rotation of the cam 132 to the location where the recess 136 becomes aligned with the roller 131, the bar 124 will be caused to pivot downwardly into the recess 136 so that the grid 17 becomes free to slide onto the track section 103 so that the positioning lugs come into engagement with the bar 152 of the gate mechanism 141. Shortly thereafter, the cam member 171 will come into engagement with the actuating arm 172 of the control switch 173 to effect an energization of the solenoid 196 to cause the valve 192 to shift to the position illustrated in FIG. 4 to effect a clamping of the grid 17 in the location determined by the positioning lugs 24. Simultaneous with a closing of the clamp plates 104 and 118, the mounting plate 117 actuates the control switches 167 and 168 to energize the solenoid 187 of the valve 186. The valve 186 is thereafter shifted to the position illustrated in FIG. 4 to supply pressurized fluid to the valve 184. Since during the previous movement of the carriage 32 the valve 184 has been previously energized to the correct position, fluid is supplied to one end of the power cylinder 86 to cause the piston 85 thereof to move longitudinally therealong. This effects a movement of the carriage in the opposite direction as illustrated by the arrows in FIG. 4.

When the actuating arm 64 engages one of the arms 78 of the control switch 76, the signal to the solenoid 183 is delayed until after the carriage 32 has reached the far leftwardmost position so that the carriage 32 will not reverse its direction of movement mid-way through the trimming operation. Near the left end of travel of carriage 32, the finger 63 will strike the actuating arm of the control switch 71 to energize the solenoid 178 on the valve 179 to cause the valve to shift leftwardly against the urging of the spring 181 to energize the power cylinders 158 to raise the gate mechanism 141. Simultaneous with the movement of the gate mechanism 141, the arm 162 by reason of its being fixed to the brackets 143 will respond to movement of the rods 161 of the power cylinders 158 and will pivot about the axis of the pivot pin 146 so that the finger 163 will contact the actuating arm 164 of the control switch 166 to energize the solenoid 193 on the valve 192 and cause the valve 192 to shift rightwardly to cause the clamp mechanism to open. Simultaneous with the opening of the clamp mechanism, the trimmed grid 17 will slip out from between the clamping plates 104 and 118 down onto the track 99 and thence onto the endless conveyor 19.

The aforementioned grid trimming operation is repeated in the same manner except that in the next operation the valve 184 is shifted leftwardly during the previous grid trimming operation so that fluid pressure is applied to the right end of the power cylinder 86 to cause the carriage to move rightwardly toward the right side of the grid trimming section 18.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a machine for trimming a battery grid including an inclined track extending downwardly, the combination comprising:

first stop means spaced downwardly from the upper end of said track including first support means therefor for supporting said first stop means for movement between blocking and unblocking positions whereby said first stop means blocks a grid when said first stop means is in said blocking position and releases said grid when in said unblocking position;

second stop means spaced downwardly from said first stop means, said second stop means including second support means for supporting said second stop means for movement between blocking and unblocking positions whereby said second stop means blocks a grid and holds same between said first and second stop means when said second stop means is in said blocking position and releases said grid when in said unblocking position;

clamping means positioned between said first and second stop means and movable between opened and closed positions, said clamping means being adapted to clamp said grid between said first and second stop means when in said closed position;

guide means extending generally parallel to at least one of said first and second stop means in vertically spaced relation to said track;

carriage means and drive means therefor, said carriage means being mounted on said guide means and supported for movement therealong;

rotating saw means supported on said carriage and adapted to engage and thereby trim said grid as said carriage is driven along said guide means; and control means for causing a movement of said carriage means along said guide means only when said clamp means is in said closed position.

2. A grid trimming device according to claim 1, wherein said control means includes first means adapted to cause said second stop means to move to said unblocking position after said carriage means has made a complete traverse along said guide means and further means responsive to said first mentioned means and adapted to cause said clamp means to move from said closed position to said open position.

3. A grid trimming device according to claim 2, wherein said further means is further adapted to cause said clamp means to open only after said first mentioned means has caused said second stop means to move to said unblocking position.

4. A grid trimming device according to claim 1, wherein said guide means extends laterally of said machine and above said track.

5. A grid trimming device according to claim 1, wherein said second stop means includes adjustable support means for supporting said second stop means for adjustable movement toward and away from said first stop means.

* * * * *